United States Patent
Gordon

[15] 3,685,342
[45] Aug. 22, 1972

[54] BEARING TORQUE TEST INSTRUMENTS

[72] Inventor: Keith M. Gordon, Munsonville, N.H.

[73] Assignee: MPB Corporation, Keene, N.H.

[22] Filed: March 30, 1970

[21] Appl. No.: 23,948

[52] U.S. Cl. .................................................. 73/9
[51] Int. Cl. ........................................... G01m 13/04
[58] Field of Search ......... 73/9, 4 D; 308/1 C; 269/20

[56] References Cited

UNITED STATES PATENTS

| | | | |
|---|---|---|---|
| 3,225,587 | 12/1965 | Gordon | 73/9 |
| 3,209,623 | 10/1965 | Schardt | 269/20 X |
| 3,133,435 | 5/1964 | Lewis, Jr. | 73/4 D |

*Primary Examiner*—Louis R. Prince
*Assistant Examiner*—Daniel M. Yasich
*Attorney*—Pennie, Edmonds, Morton, Taylor and Adams

[57] ABSTRACT

A bearing torque test instrument for measuring the torque transmitted to one race member of the test bearing from the other driven race member. The instrument comprises, generally, a vertically adjustable upper gas bearing assembly adapted to mate with and drive one race member of the test bearing over a full range of operating speeds, a lower gas bearing assembly supporting the other race member of the test bearing and a torque sensing system operatively connected to the other race member for measuring the running torque of the test bearing. The lower gas bearing assembly is supported for friction-free motion on a gas film which permits it to become automatically aligned with the upper gas bearing assembly so that the inner and outer race member of the test bearing are disposed in precise concentric alignment during testing.

16 Claims, 6 Drawing Figures

PATENTED AUG 22 1972

INVENTOR.
KEITH M. GORDON
BY Pennie, Edmonds,
Morton, Taylor & Adams
ATTORNEYS

PATENTED AUG 22 1972 3,685,342

INVENTOR.
KEITH M. GORDON
BY Dennis, Edmonds,
Morton, Taylor & Adams
ATTORNEYS

BEARING TORQUE TEST INSTRUMENTS

RELATED APPLICATION

The present application discloses an improvement of the bearing torque test instrument disclosed in my application Ser. No. 301,845, filed Aug. 13, 1963, now U.S. Pat. No. 3,225,587 *Bearing Torque Test Instrument*.

BACKGROUND OF THE INVENTION

My U.S. Patent mentioned above discloses a bearing torque test instrument for testing bearings of the type having an inner race member and an outer race member with rolling elements disposed therebetween. Such an instrument is particularly well suited for measuring minute defects in miniature and instrument ball bearings, including such imperfections as eccentricity, out-of-roundness, waviness, defects in finish of the coacting race members and the rolling element surfaces and the like. With this instrument the inner race member of the test bearing is mounted on a precision spindle assembly suspended from a massive driven rotor which is rotatably supported both radially and in thrust by a substantially friction-free gas bearing.

The outer race member of the test bearing mates with a low inertia cylindrical sleeve which is radially supported by a gas bearing spindle disposed inside the sleeve. A small air-cell loading chamber is defined by the uppermost end of the sleeve which is closed and the top portion of the gas bearing spindle disposed inside the sleeve.

A torque sensing system in the form of a closed electrical servo-loop is provided to measure the torque transmitted from the inner driven race member through the rolling elements to the outer race member which is operatively connected through the air bearing supported sleeve to the torque sensing system.

With the structure of the bearing torque test instrument disclosed in my aforementioned U.S. Patent, the inner race member is smoothly driven at a uniform speed with the massive driven rotor effectively ironing out (by fly-wheel action) all of the slight variations in drive motor speed. Accordingly the driven inner race of the test bearing is effectively isolated from all imperfections in the test bearing support that might otherwise be falsely sensed by the test instrument and read out as imperfections in the bearing itself. Furthermore, because of its substantially friction free support, the mass of the torque sensing system remains substantially invariant as a function of the axial or thrust load applied to the test bearing. Thus a uniform response sensitivity is maintained independently of the axial loads used during tests.

With the bearing torque test instrument disclosed in my above referenced U.S. Patent, there are certain features which, in some cases, may restrict its use from the standpoint of general application. In my prior bearing torque test instrument, the tooling which supports the outer race member of the test bearing must be precision machined so that precise concentricity between the inner and outer race members of the test bearing is maintained at all times throughout the period in which the bearing is being tested. This is necessary in order to obtain readings of running torque which accurately reflect the influence of actual bearing defects rather than defects in the test apparatus. The degree of precision machining required to obtain an isolated reading of the true running torque of the test bearing is extremely expensive and cannot always be justified in terms of the projected use for the instrument. This is especially true when the instrument is to be used to test a wide range of bearing types and sizes.

Also, with the construction disclosed in my U.S. Pat. No. 3,225,587, the rotor from which the precision spindle assembly mating with the inner race member is suspended is rim driven by frictional contact with a suitable drive wheel. Due to normal wear and tear resulting from extended periods of usage, the frictional force between the inner and outer race members of the test bearing sometimes exceeds the frictional force between the drive wheel and rotor causing slippage of the drive wheel with consequent variance in the running speed of the inner race member. This, in turn, produces abnormal deviations in response from the test instrument which may falsely be interpreted as bearing abnormalities or imperfections. Even if such deviations are correctly determined to be due to a faulty drive assembly rather than to a faulty test bearing, repair or replacement of the malfunctioning drive assembly is not only costly but time consuming and generally detracts from the overall usefulness of the instrument.

Another characteristic of the bearing torque test instrument disclosed in my above mentioned U.S. Patent relates to the use of a motor mechanically connected to the rotor for driving the precision spindle assembly which mates with the inner race member of the test bearing. At low speeds, the use of a motor for this purpose often results in non-uniform speed characteristics in the test bearing. This phenomenon is due primarily to "cogging effects" recognizable at such speeds. At relatively high speeds, cogging effects are generally imperceptible and, therefore, can be tolerated with insignificant effects on the torque measurements obtained from the test instrument.

Yet another characteristic of my previously patented bearing torque test instrument relates to its adaptability for testing bearings of different sizes and types. In this connection, the spindle assemblies which mate with the inner and outer race members are contained within a rigid housing structure and, therefore, they are held in a fixed position with respect to each other in the sense that they are longitudinally fixed on a line coincident with the axis of the test bearing. As a result the instrument is somewhat limited in the range of bearing sizes it can accommodate without structural modifications.

SUMMARY OF THE INVENTION

In accordance with the teachings of the present invention an improved bearing torque test instrument is provided. Generally, the instrument includes an upper gas bearing assembly adapted to mate with and drive the inner race of the test bearing. This assembly includes a vertically disposed gas driven turbine which, like the rotor disclosed in my prior construction, is supported both radially and axially by gas bearings. The use of a gas driven turbine in place of an exclusively motor driven rotor allows the bearing torque test instrument of the present invention to operate over a full range of speed capability. A gas braking circuit is also provided to bring the turbine to a rapid halt when the test has been concluded or when it is otherwise desired to quickly stop the operation of the instrument. For operating at low speeds, the precision turbine of the upper gas bearing assembly may, with the bearing torque test instrument of the present invention, be optionally driven by a motor removably connected to the turbine.

The upper gas bearing assembly mating with the inner race member of the test bearing is adjustably supported for vertical movement along an upstanding frame member of the test instrument. This feature allows the bearing torque test instrument of the present invention to accommodate a wider range of bearing sizes and configurations than was heretofore possible with the bearing torque test instrument disclosed in my U.S. Pat. No. 3,225,587.

For receiving the outer race member of the test bearing and supporting it for substantially friction-free rotation, the gas bearing spindle and the low inertia cylindrical sleeve disclosed in my U.S. Pat. No. 3,225,587 is replaced by a lower gas bearing assembly which is itself supported by a gas bearing for substantially friction-free movement over the platen of the test instrument. This feature provides the bearing tester of the present invention with automatic self-alignment for any size or type of test bearing without the necessity for precision manufacture of separate tooling for supporting the outer race member of the bearing to be tested.

In construction the lower gas bearing assembly includes a piston housing having an internal cylindrical wall defining a piston chamber and a piston sleeve supporting the outer race member of the test bearing. The piston sleeve chamber by a radial gas bearing. This arrangement allows wobble-free and friction-free rotation of the outer race member as a result of torque transmitted to it from the inner race member of the test bearing. The piston housing is supported in spaced relationship to the platen of the test instrument on a gas film. With this arrangement, the entire lower gas bearing assembly including the piston housing and the gas bearing supported piston sleeve contained therein is permitted to float above the platen and find a natural position of equilibrium wherein the outer race member is precisely aligned in concentric relationship with the inner race member of the test bearing.

Compressed gas is also supplied to the lower chamber defined by the lower end of the piston sleeve and the bottom of the piston chamber. This permits the piston sleeve to be subjected to variable axial loading so that the test bearing may also be tested under various axial loads.

The improved bearing torque test instrument of the present invention is also provided with means for applying a radial load to the test bearing. In construction this means comprises a horizontally acting pneumatic piston rod assembly mounted on the platen of the test instrument. A shoe contacting the external surface of the piston housing is connected to the operating end of the piston rod. Upon activation, the piston rod acting through the shoe operates to apply a force parallel to the platen and intersecting the axis of the test bearing to effectively produce a radial load applied to the test bearing.

The torque sensing system of the present invention comprises an electromechanical force transducer which produces an output signal proportional to force. Force is transmitted to the transducer by means of a mechanical force arm operatively connected to the outer race member of the test bearing and held in contact with the load cell of the transducer is fed into a two-axis read-out indicator capable of plotting torque vs. load, torque vs. speed or torque vs. time for given speed and load conditions.

DETAILED DESCRIPTION OF THE INVENTION

Figures 1, 1A:
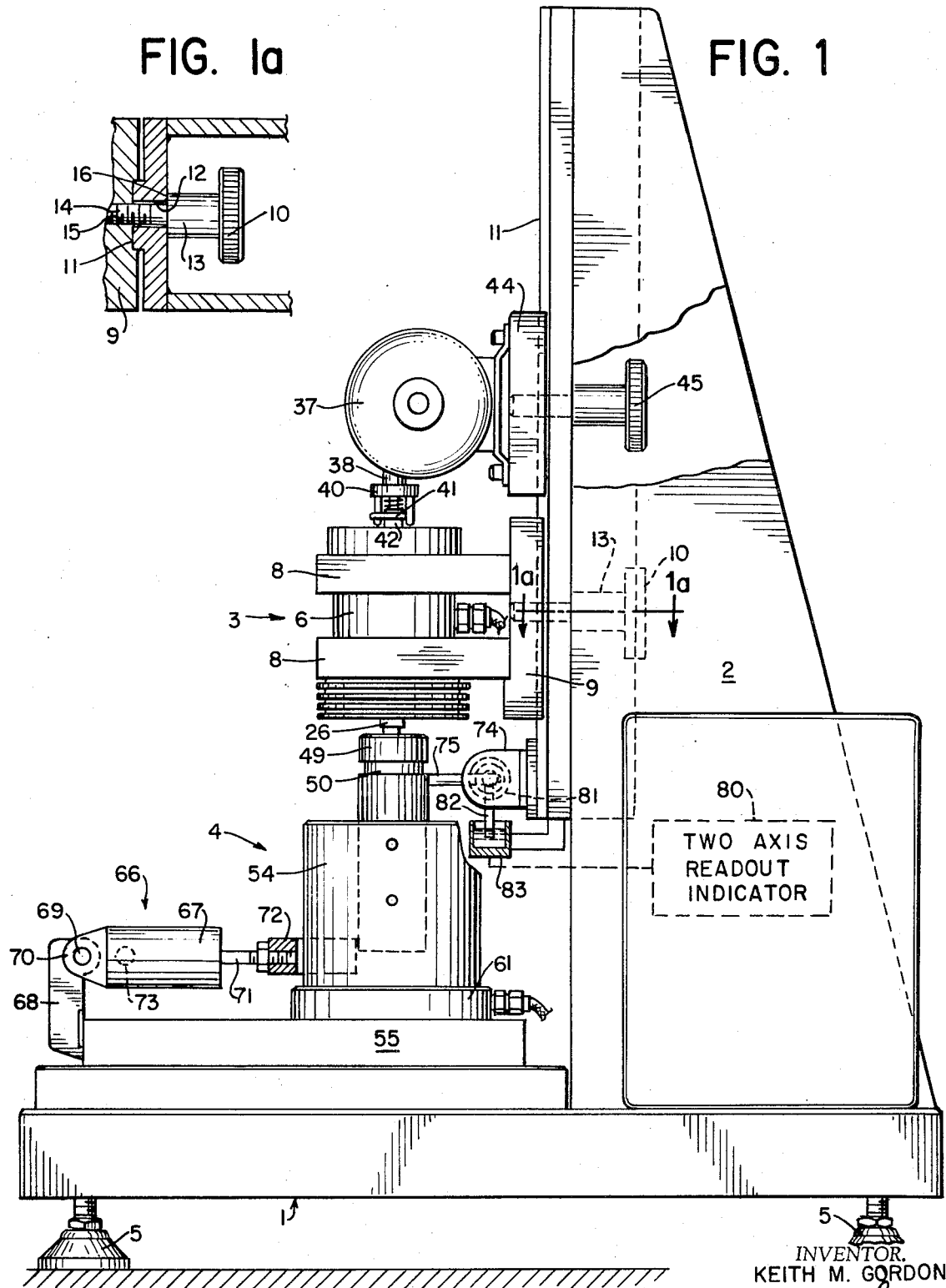
FIG. 1 is an elevation view illustrating the various mechanical features of the bearing torque test instrument of the present invention.
FIG. 1a is a cross-sectional view taken along the lines 1a—1a of the FIG. 1.
Figure 2:
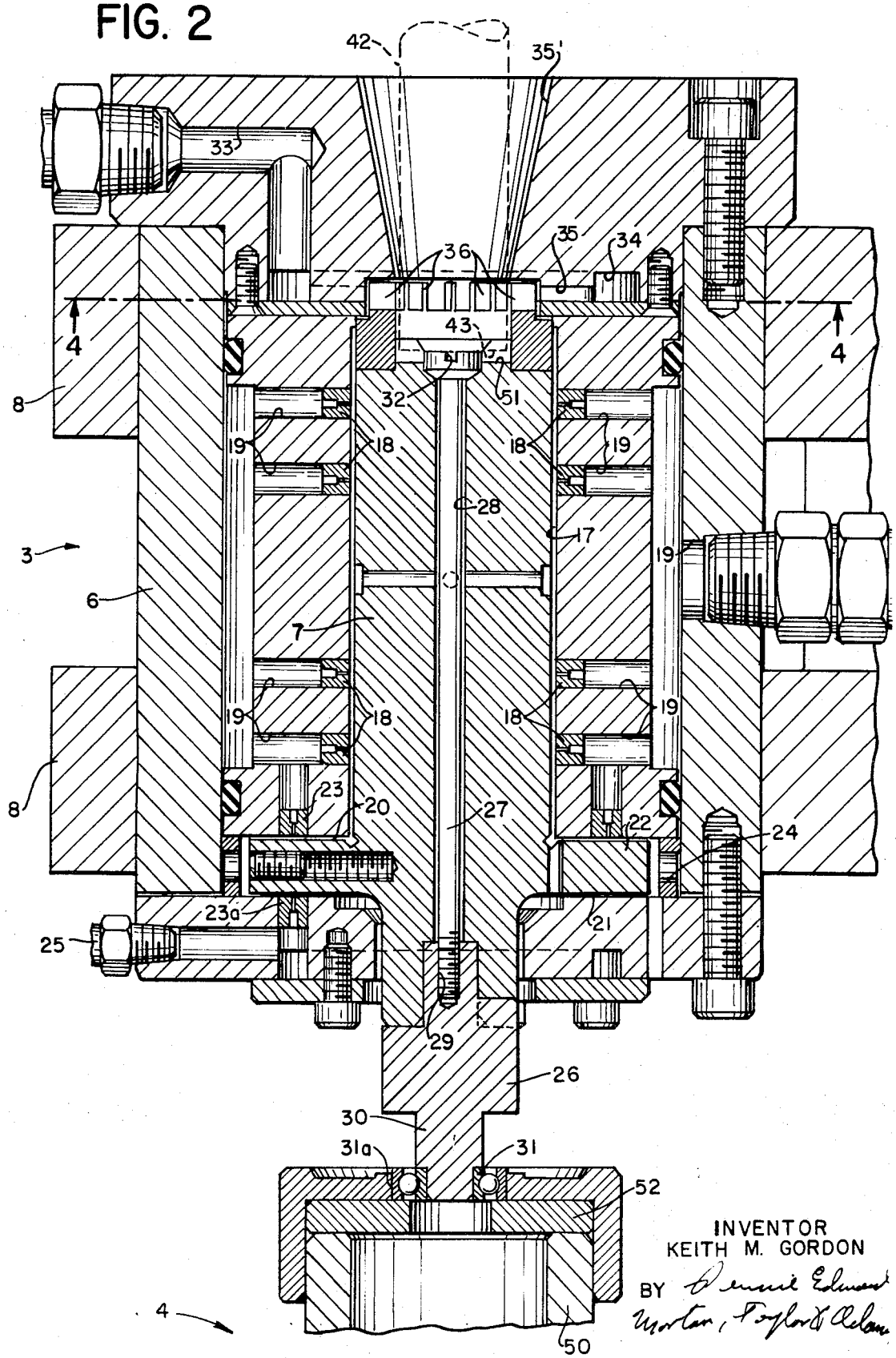
FIG. 2 is an enlarged elevation view, in cross section, of the upper gas bearing assembly of the bearing torque test instrument of this invention showing also a partial cross-sectional view of the lower gas bearing assembly.

As shown in FIGS. 1 and 2 the bearing torque test instrument of this invention generally includes a base frame 1, an upstanding frame member 2 connected to the base frame, an upper gas bearing assembly indicated generally by reference numeral 3 for rotatably supporting the inner race member 31 of a test bearing and a lower gas bearing assembly indicated generally by reference numeral 4 for supporting the outer race member 31a of the test bearing. Adjustable leveling feet 5 are provided for properly positioning the base frame 1 in a horizontal plane.

The upper gas bearing assembly 3 is adjustably mounted for vertical movement along the frame member 2 and includes a housing 6 and a vertical turbine 7. The turbine 7 is supported radially and axially within the housing on gas bearings, the details of which will be described further in connection with FIGS. 1 and 2.

The housing 6 is connected via brackets 8 to a support block 9 which is, in turn, attached by means of locking rod 10 to a trackway 11 secured to the front face of frame member 2. As shown in FIG. 1a, the trackway 11 is provided with a longitudinal slot 12 within which the locking rod 10 may be moved so that the support block 9 may be fixed in any desired vertical position along the frame member. The locking rod 10 has a shank 13 and a threaded reduced diameter portion 14 forming an extension of the shank. When the support block 9 has been moved to its proper vertical position, the locking rod 10 is inserted from the back through the slot 12 and threaded into a mating internally threaded receiving hole 15 provided in the support block 9 in alignment with the slot 12. The rod 10 is then turned until the shoulder 16 formed between shank 13 and the reduced diameter portion 14 is tightly clamped against the back surface of the trackway thereby locking the support block and attached upper gas bearing assembly in place.

Referring now to FIG. 2, the turbine 7 is supported in a cylindrical gas bearing directed through a precision cylindrical bore 17 by a plurality of gas jets 18 symmetrically displaced around the side walls of the bore 17. Compressed gas is supplied to jets 18 from an external source (not shown) through supply duct 19. Turbine 7 is also supported vertically or axially by a second gas bearing acting against the upper and lower flat surfaces 20 and 21 on cylindrical plate 22. As illustrated, the cylindrical plate 22 is preferably formed integral with the turbine 7, as for example, by turning the entire assembly on a lathe from a common piece of stock. This method of forming the turbine and cylindrical plate advantageously insures precision manufacture by minimizing tolerance buildups. A plurality of gas jets 23 and 23A are symmetrically disposed in the lower portion of the housing 6 and supply gas pressure against the opposed flat surfaces 20 and 21 to provide a stiff substantially friction-free thrust support for turbine 7. Gas flow from jets 23 and 23A is exhausted via ducts 24 symmetrically disposed around the outer wall of the housing 6 as shown. The lower jets 23A are supplied by the tube 25 which is connected to a variable pressure compressed gas supply. With this arrangement, the supply pressures for the lower gas jets 23A and upper jets 23 may be differentially varied to accommodate a desired range of thrust loads on the turbine 7.

In the construction shown in the drawings, the inner race member of the test bearing is driven by the precision cylindrical turbine 7 described above. The outside diameter of the cylindrical turbine is machined to a substantially constant diameter throughout the full length of the bearing surface (major diameter); and one end of the turbine is bored to receive a removable arbor 26. Arbor 26 is retained in the bore of turbine 7 by draw bolt 27 which extends through a central axial bore 28 in the main turbine 7 and into a mating threaded bore 29 in the arbor 26. A reduced shaft extension 30 is provided on the arbor 26 to mate snugly with the inner race member 31 of the test bearing. Shaft extension 30 is accurately machined with reference to the receiving bore 28 in the main turbine 7 and with respect to the axis of rotation for the main turbine so that a common axis of rotation is maintained throughout. The arbor 26 is easily removed from the main turbine 7 by rotating the draw bolt 27 by means of a screw driver head (not shown) inserted into the groove 32 cut diametrically in the upper end of the draw bolt 27. This tooling feature expedites conversion of the test instrument to accommodate bearings of different sizes and types.

Figure 4:
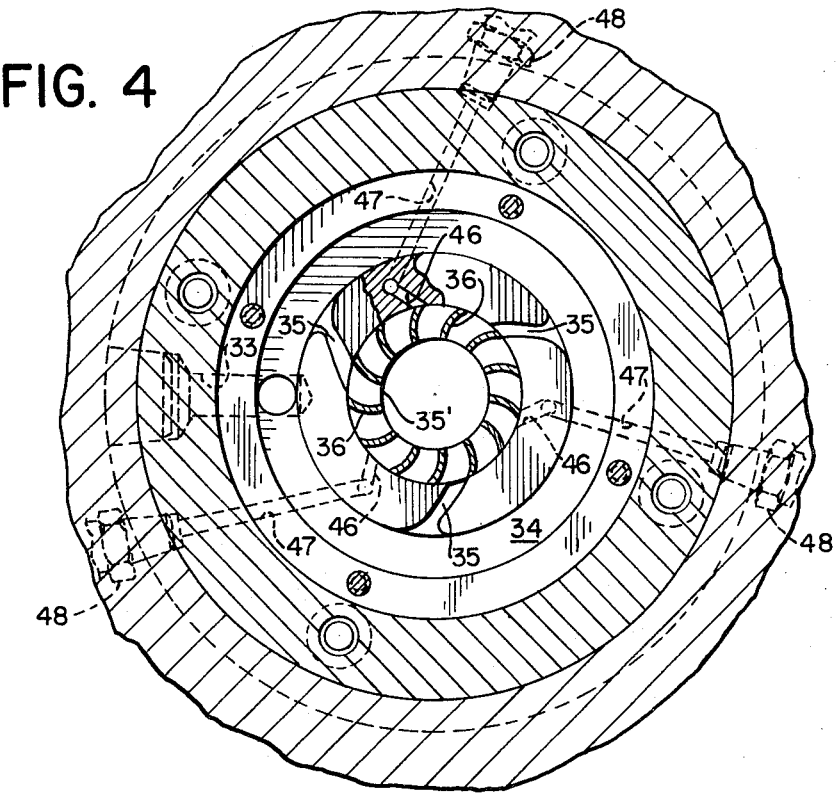
FIG. 4 is a cross-sectional view taken along the line 4—4 of FIG. 2.

The turbine 7 is equipped with dual drive means for high and low speed operation of the test instrument. For high speed operation, the turbine 7 is, as shown most clearly in FIG. 4, driven by compressed gas supplied under pressure from an external source (not shown) by tubular conduit 33 into an annular distribution chamber 34 surrounding the turbine and then through gas jets 35 communicating with a series of turbine buckets 36 upstanding from the upper end of the turbine. The gas jets 35 are directed inward at an angle such that the compressed gas impinges on the turbine buckets 36 to drive the turbine in a counterclockwise direction as viewed in FIG. 4. Gas flow through jets 35 is exhausted through a tapered exhaust port 35' provided in the top of housing 6. Also, a suitable muffling device (not shown) may be installed over the exhaust port 35' to cut down noise during operation at high speeds.

For low speed operation as, for example, at speeds below say a few hundred rpm, the turbine 7 may be advantageously driven by a motor 37 as shown in FIG. 1. For effecting connection between the motor 37 and the turbine 7 removable connector means is provided. This means comprises a drive stud 38 operatively attached at one end to the motor and having a standard clevis connector 40 secured to its free end. The clevis connector 40 coacts with a pin 41 extending in a perpendicular direction through the upper portion of stub shaft 42. The stub shaft extends through the exhaust port 35' and its lower end is provided with a diametrically disposed tongue 43 adapted to mate with the groove 51 cut diametrically in the upper end of the turbine 7. The stub shaft 42 is shown in its operative position by dotted lines in FIG. 2. The motor 37 is slideably attached to the trackway 11 by support block 44 and secured in the proper vertical position by locking rod 45 in the same manner as is the upper air bearing assembly 3 described in connection with FIG. 1a.

Referring again to FIG. 4, the upper gas bearing assembly 3 is also provided with a gas operated braking circuit for use during high speed operation of the test instrument. The braking circuit acts to decelerate the turbine by directing gas against the turbine buckets 36 in a direction counter to the direction of rotation of the turbine. As shown, gas is supplied to the braking gas jets 46 via tubular conduits 47 and supply ducts 48. Activation of the braking circuit automatically shuts off the supply of gas to the driving jets 35. With the braking circuit, the relatively long waiting time required until the turbine comes naturally to rest after the driving gas supply has been shut off is advantageously shortened. Also, the presence of the braking circuit acts as a safety device in that it represses the natural impatience of the operator who may otherwise place himself in a position of danger by attempting to manually hasten the deceleration of the turbine.

Figure 3:
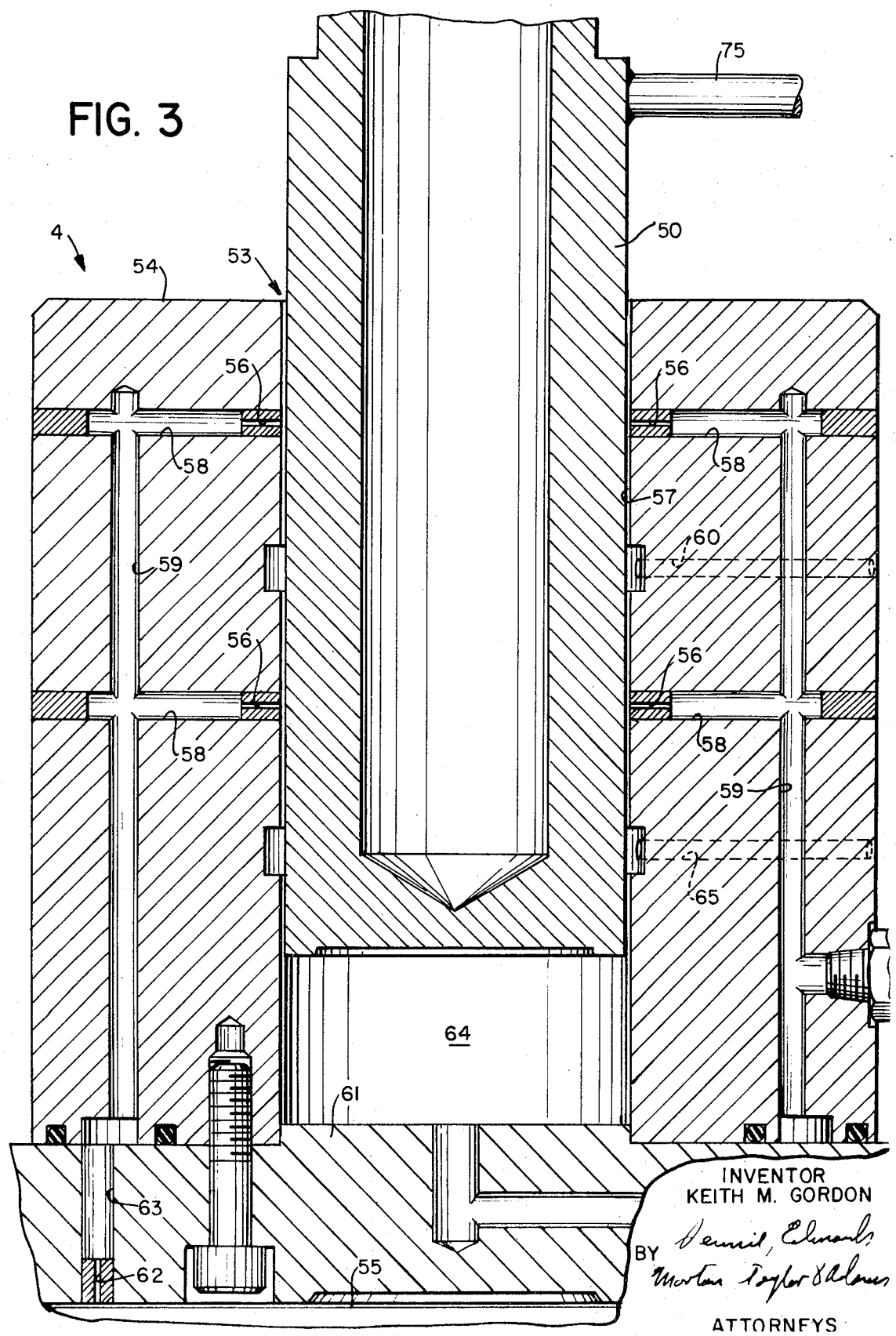
FIG. 3 is an enlarged elevation view, in cross section, of the remaining portion of the lower gas bearing assembly of the bearing torque test instrument of the present invention.

While the inner race member of the test bearing is supported for substantially friction-free and wobble-free rotation, the outer race member of the test bearing is likewise supported by the lower air bearing assembly indicated generally by reference numeral 4. As shown in FIG. 2, the outer race member 31a is snugly mated in a central bore of a removable adapter cap 49. Adapter cap 49 is removably secured to the top portion of piston sleeve 50 by a snug slip fit. Piston sleeve 50 is cylindrical in shape having the uppermost end of its internal cylindrical chamber partially covered by capping plate 52. As shown in FIG. 3, the piston sleeve 50 is disposed within a precision cylindrical piston chamber 53 formed centrally in piston housing 54. The housing is supported by platen 55 resting on the base frame 1 of the test instrument. The diameter of the piston chamber 53 is slightly larger than the outside diameter of the piston sleeve 50. A plurality of gas jets 56 are disposed symmetrically about the internal cylindrical wall 57 defining the precision piston chamber 53. The external cylindrical surface of piston sleeve 50 cooperates through the gas medium with the internal cylindrical wall 57 to provide a substantially friction-free radial gas bearing support for the piston sleeve. Compressed gas is supplied to the gas jets 56 through supply duct 58 and manifold duct 59 extending about the periphery of piston chamber 53. Gas flow from jets 56 is exhausted by dump ports 60 symmetrically disposed around the internal cylindrical wall 57 of the piston housing 54.

The base 61 of the piston housing 54 also includes a ring of gas bearing jets 62 which are supplied with compressed gas by a like number of vertically disposed supply ducts 63 communicating with the manifold duct 59. With this arrangement, the base 61 of the piston housing cooperates with the upper surface of the platen 55 to provide a gas bearing support for the piston housing 54 which serves to support the entire lower gas bearing assembly spaced above the platen 555 on a gas film in friction-free floating relationship thereto. Because of its supporting gas film, the lower gas bearing assembly is characterized by essentially free motion over the surface of platen 55. It is therefore self-aligning in the sense that it is permitted to naturally seek out a position of equilibrium such that the outer race member 31A is held on precise concentric alignment with the driven inner race member 31 of the test bearing.

The torque test instrument provided by the present invention is capable of measuring the running torque of test bearings which are operated under either variable amounts of radial loading, variable amounts of axial loading or variable amounts of combined axial and radial loadings. For applying an axial load to the test bearing, compressed gas is supplied to subchamber 64 situated in the lower portion of the main piston chamber 53 and defined in its upper region by the lower end of the piston sleeve 50 and in its lower region by the bottom surface of the precision piston chamber 53. The axial load placed on the outer race member 31a of the bearing is varied as required by adjusting the gas pressure supplied to subchamber 64. The gas pressure in chamber 64 is slowly removed or exhausted via the annular clearance between piston sleeve 50 and the internal cylindrical wall 57 and then through exhaust dumps 65.

It will be appreciated that the axial loading placed on the outer race of the test bearing may be varied without in any way altering the rotational friction or rotational inertia of the piston sleeve 50. Thus the running torque of the test bearing may be measured under various load conditions without the introduction of spurious torque components and without alteration of the measuring sensitivity or dynamic characteristics of the instrument.

For applying a radial load to the test bearing, a pneumatically operated piston rod assembly indicated generally by reference numeral 66, is provided. As shown in FIG. 1, the piston rod assembly 66 includes a cylinder 67 pivotally mounted via support member 68 to the base frame 1 by pin 69 extending through trunnion 70 formed in the end of cylinder 67. A piston rod 71 having a shoe 72 attached to its operating end is mounted for longitudinal movement within cylinder 67. During use the shoe 72 contacts the external cylindrical surface of the piston sleeve housing 54 of the lower gas bearing assembly with the piston rod disposed parallel to the platen 55 of the test instrument so that its longitudinal axis perpendicularly intersects the axis of rotation of the test bearing. Compressed gas is supplied at variable pressures by conduit 73 to the cylinder 67 to bring the piston rod 71 and attached shoe 72 to bear against the piston sleeve housing 54 under an applied force which, because of the orientation of the piston rod with respect to the housing effectively produces a radial load on the test bearing. The pivotal connection between the pneumatic piston rod assembly 66 and base frame 1 advantageously permits the piston rod assembly 66 to be easily swung to an inoperative position when desired.

As shown most clearly in FIG. 1, the torque sensing system used to sense and record the torque transmitted to the outer race member of the test bearing from the driven inner race member includes an elctromechanical force transducer 74 mounted on the frame member 2. The force transducer produces an output signal proportional to force; and this signal is fed into a two-axis read-out indicator, indicated diagrammatically at 80. The read-out indicator 80 is of the type having the capability of recording two vertical variables against one horizontal variable or against time, such as for example, torque vs. speed, torque vs. load, or torque vs. time for given load and speed values. A conventional X-Y plotter or oscilloscope is suitable for purposes of practising the present invention. In order to obtain torque measurements, force is transmitted to the load cell 81 of the transducer through a moment or force arm 75. The force arm 75 is operatively connected at one end via piston sleeve 50 too the outer race member of the test bearing and, at its other end, the force arm is magnetically held in contact with the load cell 81 of the transducer during operation of the test instrument. Viscous damping is provided by a small paddle 82 mounted to the nose of the force transducer 74 and suspended in a receptacle 83 of damping fluid. In the presently preferred embodiment of this invention, the force transducer has a load cell of the type utilizing an unbonded strain gauge bridge and having a maximum force capacity of approximately 30 gm. operating on a moment arm of about 5.5 cm. It will be recognized, however, that load cells of other capacity are available and could be utilized. Similarly, by simple redesign of the support brackets 8 for the driving motor and upper air bearing assembly 37 and 3, respectively, the presently preferred moment arm length of 5.5 cm. could be changed.

Figure 5:
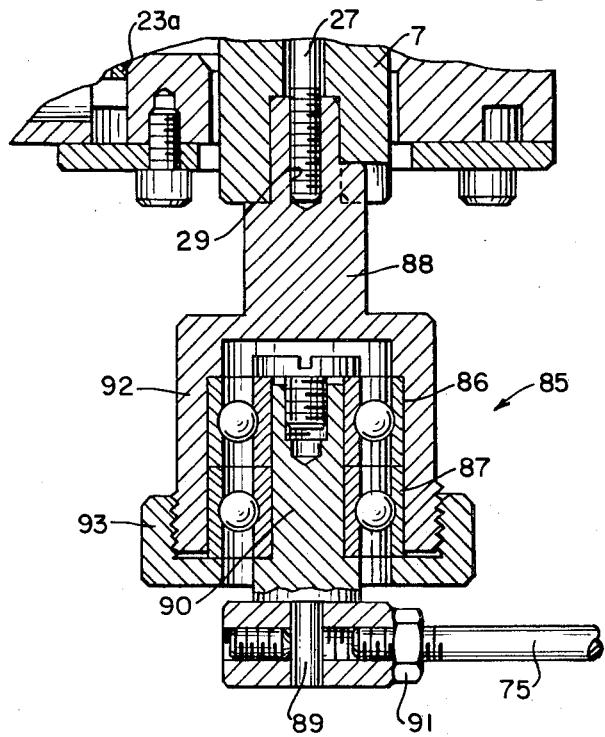
FIG. 5 is a fragmentary cross-sectional view showing a pre-loaded bearing pair being tested with the torque test instrument of the present invention.

With the bearing torque test instrument of this invention several advantages, in addition to those already mentioned, are provided. Due to the vertical adjustability of the upper gas bearing assembly, the test instrument is extremely versatile in that it is able to accommodate virtually any size or type of bearing such as pivot bearings, thrust bearings, radial bearings. In addition, the bearing tester of this invention may be used to test various types of instrument assemblies which use bearings such as a gyro spin motor assembly, a small servo motor or a long capstan such as those used to transport recording tapes. Also, because of the automatic alignment provided by the gas film supported lower gas bearing assembly, expensive precision machined tooling requirements for the inner and outer race members of each particular test bearing is minimized. The full impact of the versatility and adaptability of the instrument to virtually all types of bearing testing problems can be best understood by reference to FIG. 5 wherein it will be seen that the improved bearing torque test instrument of the present invention has been adapted for measuring the torque characteristics of a preloaded bearing pair.

For this application the lower gas bearing assembly normally used for testing most types of bearings is removed simply by sliding it out from beneath the upper gas bearing assembly. A conventional fixture assembly indicated generally by reference numeral 85, commonly used to apply a predetermined and built-in axial load to a pair of bearings 86 and 87 is provided. Briefly, this assembly is attached to the upper gas bearing assembly and suspended for free rotation with turbine 7 by means of arbor extension 88 in the manner previously described. The force arm 75 is attached to the lower extension 89 of precision shaft 90 by bolt means 91. As shown, the precision shaft 90 mates snugly with the inner race members of the test bearings 86 and 87 while the arbor extension 88 and sleeve 92 form a unitary structure with the driven outer race members. This unitary structure is provided through the clamping load-applying action of threaded retainer nut 93. The torque transmitted from the outer race members to the inner race members of the preloaded bearing pair is sensed and recorded by the torque sensing system described above in the same manner as the torque transmitted from the inner to the outer race member of a single bearing is sensed. As far as known, no bearing tester heretofore available has the capability to test both single bearings and preloaded bearing pairs.

The bearing torque test instrument of the present invention can be loaded with a new bearing quickly and conveniently. For this purpose the gas pressure in chamber 64 is reduced to zero psi thus allowing the piston sleeve 50 to drop into the main chamber 53 pulling the test bearing free of the arbor 26 previously mated with the inner race member. The piston housing 53 may then be easily moved on its supporting gas film to a position of free access on the platen 55 where the old test bearing and tooling may be easily removed and replaced with the necessary tooling for the new test bearing.

The bearing tester of the present invention is, as mentioned above, capable of simultaneously recording load, speed, and torque over a full range capability of the instrument. Furthermore, the load applied to the test bearing and its operating speed is fully adjustable over a given range. Moreover, the load applied may be solely axial, solely radial, or combined axial and radial.

The test instrument disclosed by the present invention is also driven at all speeds efficiently and smoothly. At high speeds the gas driven turbine is most acceptable while at low speeds when the gas driven turbine begins to lose efficiency, the test instrument may be quickly and easily converted to a motor drive for continued vibration free operation.

The use of gas bearings supporting the drive turbine and the piston sleeve provides several advantages in addition to those mentioned above. First, gas bearings of the type described insure that the torque developed in the tester is uniform and repeatable at each level of load and speed; and, torque measurements obtained from the tester are not affected by bearing friction as the gas bearings are substantially frictionless. Moreover, the use of gas bearings to support the drive turbine and related tooling insures precision alignment of the drive turbine and the test bearing regardless of the source of driving power.

While the above description of the present invention has been made with reference to driving the inner race member of the test bearing and sensing torque transmitted to the outer race member of the test bearing, it is to be understood that this preferred mode of operation can be reversed by simple tooling changes well known to persons skilled in the art.

I claim:

1. A bearing torque test instrument for testing a bearing having inner and outer race members and rolling elements disposed therebetween comprising:
   a. a support;
   b. rotatable drive means mounted on said support and adapted to engage with one of said race members of the test bearing;
   c. first gas bearing means for axially and radially supporting said drive means on said support;
   d. a gas bearing assembly for radially supporting the other race member of the test bearing for substantially friction-free rotation;
   e. a platen positioned below said gas bearing assembly;
   f. a second bearing means for supporting the gas bearing assembly spaced above said platen in substantially friction-free floating relationship thereto; and
   g. torque sensing means operatively connected to the other race member for measuring the torque transmitted from the one race member to the other race member of the test bearing.

2. A bearing torque test instrument according to claim 1 including:
   a. means for applying an adjustable radial load on the test bearing.

3. A bearing torque test instrument according to claim 1 including:
   a. means for applying an adjustable axial load on the test bearing.

4. A bearing torque test instrument according to claim 1 including:
   a. means for mounting said drive means for adjustable positioning along said support.

5. A bearing torque test instrument according to claim 1 wherein:
   a. said drive means includes:
      1. a housing structure mounted on said support; and
      2. a gas driven turbine vertically disposed within said housing structure and mating with the one race member of the test bearing.

6. A bearing torque test instrument according to claim 1 wherein:
   a. said gas bearing assembly includes:
      1. a piston housing having a base and an internal cylindrical wall defining a piston chamber;
      2. a cylindrical piston sleeve supporting the outer race member of the test bearing and disposed within said piston chamber;

3. means for supplying pressurized gas into the annular space between the piston sleeve and said internal cylindrical wall to provide a substantially friction-free radial gas bearing support for said piston sleeve; and
b. said second gas bearing means supporting the gas bearing assembly includes:
1. means for supplying pressurized gas between said base and said platen to provide a gas film supporting the piston housing spaced above said platen.

7. A bearing torque test instrument according to claim 6 wherein:
a. said means for supplying pressurized gas into said annular space includes a plurality of gas jets symmetrically disposed about said internal cylindrical wall and directed radially inward toward said piston chamber; and
b. said means for supplying pressurized gas between said base and said platen includes a plurality of gas jets extending through said base and directed toward said platen.

8. A bearing torque test instrument according to claim 7 wherein:
a. the gas jets disposed in said internal wall and the gas jets extending through said base are disposed in intercommunicating relationship with each other and are supplied with pressurized gas from a common source.

9. A bearing torque test instrument according to claim 6 including:
a. means for applying an adjustable force to said piston housing in a direction perpendicular to and intersecting the axis of the test bearing to produce effectively a radial load on the test bearing.

10. A bearing torque test instrument according to claim 9 wherein:
a. the lower end of said piston sleeve and the inner end of said piston chamber define a gas subchamber; and
b. means are provided for supplying pressurized gas to said subchamber to apply an adjustable axial load on said test bearing.

11. A bearing torque test instrument according to claim 6 wherein said drive means includes:
a. a housing structure mounted on said support; and
b. a gas driven turbine vertically disposed within said housing structure and mating with the inner race member of the test bearing, said turbine having:
1. a plurality of turbine buckets upstanding from the top of said turbine; and
2. means for supplying pressurized gas impinging on said turbine buckets to rotate said turbine in one direction.

12. A bearing torque test instrument according to claim 11 including:
a. braking means for supplying pressurized air impinging on said turbine buckets in a direction counter to said one direction to decelerate said turbine.

13. A bearing torque test instrument according to claim 11 including:
a. selectively operable mechanical drive means mounted on said support for rotating said turbine, said mechanical drive means being detachably connected to said turbine.

14. A bearing torque test instrument according to claim 13 wherein:
a. said housing structure and said mechanical drive means are individually mounted on said support member for adjustable positioning therealong.

15. A bearing torque test instrument for testing a bearing having inner and outer race members and rolling elements disposed therebetween comprising:
a. a support
b. rotatable drive means mounted on said support and adapted to engage with one of said race members of the test bearing;
c. first gas bearing means for axially and radially supporting said drive means on said support;
d. a gas bearing assembly having first and second parts supported in gas bearing relationship to each other for radially supporting the other race member of the test bearing on the first part thereof for substantially friction-free rotation;
e. a platen positioned below said gas bearing assembly;
f. gas bearing means for supporting the second part of the gas bearing assembly spaced above said platen in substantially friction-free floating relationship thereto; and
g. torque sensing means operatively connected to the other race member for measuring the torque transmitted from the one race member to the other race member of the test bearing.

16. A bearing torque test instrument for testing a bearing having inner and outer race members and rolling elements disposed therebetween comprising:
a. a support;
b. rotatable drive means mounted on said support and adapted to engage with one of said race members of the test bearing;
c. first gas bearing means for axially and radially supporting said drive means on said support;
d. a gas bearing assembly for radially supporting the other race member of the test bearing, for substantially friction-free rotation;
e. a platen positioned below said gas bearing assembly;
f. gas bearing means for continuously supporting the gas bearing assembly spaced above said platen during the testing operation in substantially friction-free floating relationship thereto; and
g. torque sensing means operatively connected to the other race member for measuring the torque transmitted from the one race member to the other race member of the test bearing.

* * * * *

UNITED STATES PATENT OFFICE
CERTIFICATE OF CORRECTION

Patent No. 3,685,342          Dated  August 22, 1972

Inventor(s)   Keith M. Gordon

It is certified that error appears in the above-identified patent and that said Letters Patent are hereby corrected as shown below:

Column 1, line 9, "3,225,587, Bearing, etc." should read -- 3,225,587 entitled Bearing, etc. --.
Column 3, line 33, "The piston sleeve chamber by a radial gas bearing" should read -- The piston sleeve is supported for friction-free rotation within the piston chamber by a radial gas bearing. --.
Column 4, line 5, "transducer is fed into a two-axis--" should read -- transducer by magnetic attraction. The output signal from the force transducer is fed into a two-axis --.
Column 7, line 20, "plates 555" should read -- plates 55 --;
Column 7, line 28, "held on" should read -- held in --.
Column 8, line 19, "elctromechanical" should read -- electromechanical --; Column 8, line 34, "too" should read -- to --.
Column 10, line 32, " f) a second bearing" should read -- f) a second gas bearing --.

Signed and sealed this 3rd day of July 1973.

(SEAL)
Attest:

EDWARD M. FLETCHER, JR.  
Attesting Officer

Rene Tegtmeyer  
Acting Commissioner of Patents

UNITED STATES PATENT OFFICE
CERTIFICATE OF CORRECTION

Patent No. 3,685,342  Dated August 22, 1972

Inventor(s) Keith M. Gordon

It is certified that error appears in the above-identified patent and that said Letters Patent are hereby corrected as shown below:

Column 1, line 9, "3,225,587, Bearing" should read --3,225,587 entitled Bearing--.

Column 3, line 33, "The piston sleeve chamber by a radial gas bearing." should read --The piston sleeve is supported for friction-free rotation within the piston chamber by a radial gas bearing.--

Column 4, line 5, "transducer is fed into a two-axis" should read --transducer by magnetic attraction. The output signal from the force transducer is fed into a two-axis--.

Column 7, line 20, "platen 555" should read --platen 55--;
line 28, "held on" should read --held in--.

Column 8, line 19, "elctromechanical" should read -- electromechanical --.
line 34, "too" should read --to--.

Column 10, line 32, "f) a second bearing" should read --f) a second gas bearing--.

Signed and sealed this 22nd day of January 1974.

(SEAL)
Attest:

EDWARD M. FLETCHER, JR.
Attesting Officer

RENE D. TEGTMEYER
Acting Commissioner of Patents